J. D. HAMPSHIRE.
Corn Harvester.
No. 83,155.
2 Sheets—Sheet 1.
Patented Oct. 20, 1868.
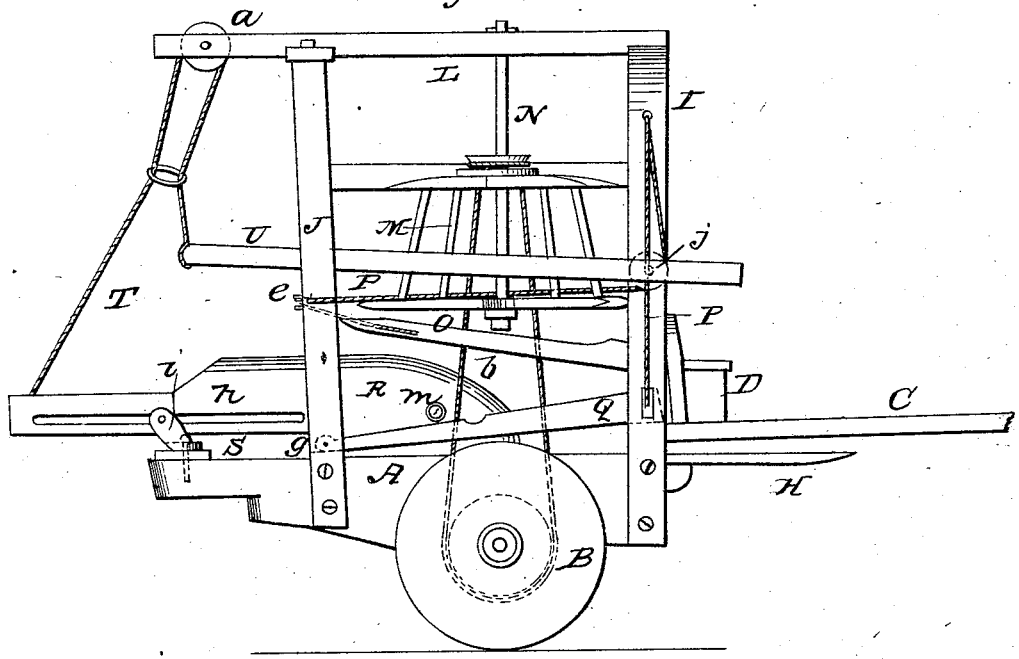
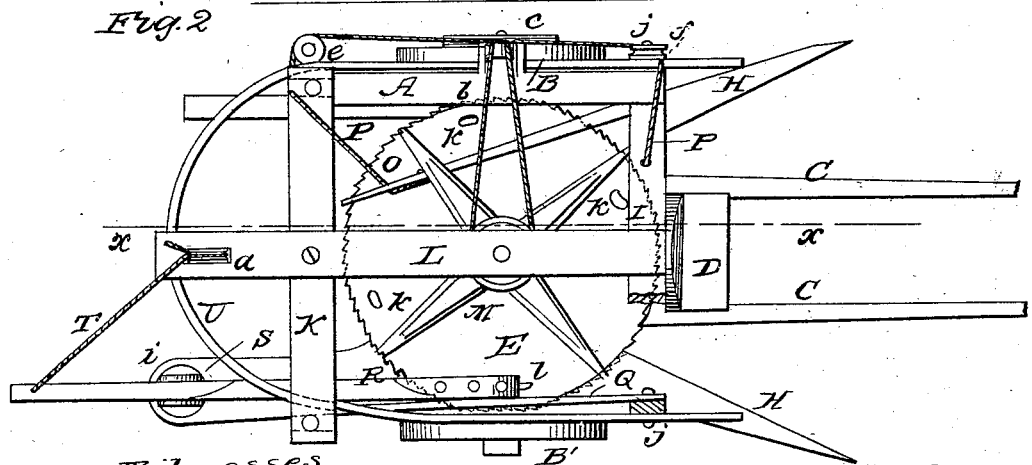

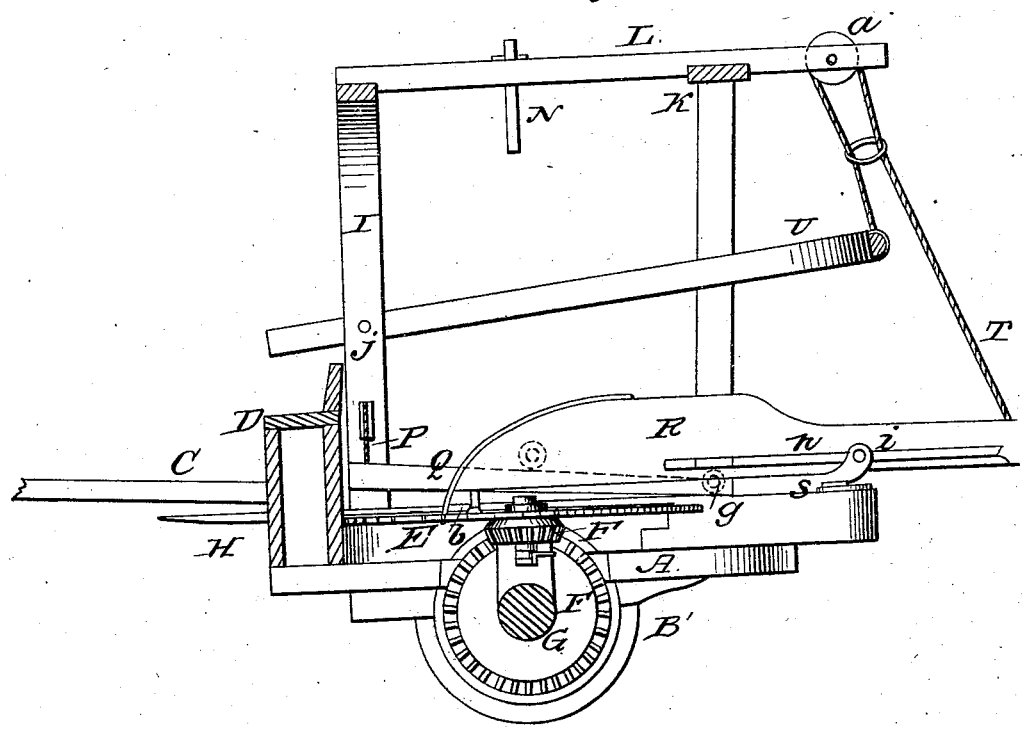

UNITED STATES PATENT OFFICE.

JOHN D. HAMPSHIRE, OF PAPER MILLS POST OFFICE, MARYLAND.

Letters Patent No. 83,155, dated October 20, 1868.

IMPROVEMENT IN CORN-HARVESTERS.

The Schedule referred to in these Letters Patent and making part of the same.

*To all whom it may concern:*

Be it known that I, JOHN D. HAMPSHIRE, of Paper Mills Post Office, in the county of Baltimore, and State of Maryland, have invented a new and improved Corn-Harvester; and I do hereby declare that the following is a full, clear, and exact description thereof, which will enable those skilled in the art to make and use the same, reference being had to the accompanying drawings, forming part of this specification.

This invention relates to a new and improved machine for harvesting maize, or Indian corn; and it consists in a peculiar construction and arrangement of parts, as hereinafter fully shown and described, whereby the standing corn may be cut and deposited upon the ground in shocks or in windrows, as desired.

In the accompanying sheet of drawings—

Figure 1, Sheet No. 1, is a side view of my invention.

Figure 2, a plan or top view of the same.

Figure 3, Sheet No. 2, a side sectional view of the same, taken in the line $x\ x$, fig. 2.

Similar letters of reference indicate corresponding parts.

A represents a frame, which is mounted on two wheels, B B', and has thills, C C, attached, with a driver's seat, D, at their rear end.

E is a circular saw, which works horizontally on the frame A, and is driven by bevel-gears F from the axle G of the wheels B B'.

To the front part of the frame A there are attached two oblique bars, H H, one at each side, said bars extending outward at each side of the thills C C, and serving as guides or gatherers for the standing corn, causing the same, as the machine is drawn along, to be properly presented to the saw.

To the front part of the frame A there is attached an upright bow, I, the ends of which are attached, one to each side of the frame, and to the rear part of the latter, at each side, there is attached an upright, J, the upper ends of which are connected by a cross-bar, K.

L is a bar, which is secured to the top part of the bow I, and to the centre of the bar K, said bar L having a longitudinal position with the machine, and extending some distance beyond the rear of K, with a pulley, $a$, inserted in it.

M is a reel, fitted on a vertical shaft, N, which is hung in the bar L. This reel M is some distance above the saw E, but is concentric with it, the shaft N being about in line with the shaft or arbor of the saw.

The reel is rotated by a band or rope, $b$, from a pulley, $c$, attached concentrically to the wheel B, said band or rope passing over guide-pulleys, $d$.

To one side of the bow I there is attached a spring-bar, O, which extends obliquely backward over and some distance above the saw E.

This spring has a cord, P, connected to it, near its end, and this cord passes around a pulley, $e$, on one of the uprights J, underneath a pulley, $f$, on bow I, and then passing through holes in said bow, extends down and is attached to the front end of a bar, Q, at the right-hand side of the machine, the rear end of said bar being connected by a pivot-bolt, $g$, to the lower part of one of the uprights J.

The spring-bar O, in connection with the cord P, has a tendency to keep the front part of the bar Q elevated.

R represents a discharging-bar, with a longitudinal slot, $h$, made in it, as shown clearly in figs. 1 and 3.

Through this slot $h$ the rod or pin $i$ of a swivel, S, passes, said swivel being attached to the rear part of the frame A.

The rear end of the bar R has a cord, T, attached to it, and this cord passes over the pulley $a$, in the rear of bar L, and is attached to a bow, U, the ends of which are secured, by pivot-bolts, $j$, to the bow I.

The saw E has a series of perforations, $k$, made in it, near its edge, and the front end of the discharging-bar R has a hook or projecting point, $l$, which, when the front end of the bar R is allowed to descend upon the saw, drops into one of the perforations $k$.

When the bar Q is elevated, the hook or point $l$ of bar R is kept elevated above the saw, on account of a button or projection, $m$, at the side of R, resting in a notch, $n$, on the top of Q. (See fig. 1.)

The operation is as follows:

The machine is drawn by two horses, harnessed one before the other, (tandem,) the horses walking between two rows of corn. The standing stalks of each row being gathered in and presented properly to the saw by the oblique bars H, the cut corn is carried around on the saw E, and is kept in proper position by the rod M; and as the stalks increase in quantity on the saw, the spring-bar O is gradually forced outward, or towards the side of the machine, thereby causing the cord P to be slackened, and the bar Q to fall, until the hook or point $l$ of the discharging-bar R will catch into one of the perforations $k$ in the saw, when bar R is moved by the saw and made to discharge the cut stalks upon the ground, butts downward, and within the bow U, which retains them in position until all have been discharged from the saw, at which time the discharging-bar R, by its backward movement, will have raised the bow U free from the discharged shock of corn, and the spring-bar O, in assuming its required position, will have raised the bar Q, and the discharging-bar R will consequently be raised out from the perforations $k$ in the saw, and thereby rendered inoperative until the succeeding corn, as it accumulates on the saw E, forces out the bar O and allows the bar Q to descend, and also the discharging-bar R, so that the point or hook $l$ of R will again catch into a perforation, $k$, of the saw, and a succeeding shock discharged.

If it be desired to discharge the corn in windrows instead of in shocks, all that is required is for the driver to draw down the cord P above his head, and thereby keep the bar Q elevated, and also the discharging-bar R.

I claim as new, and desire to secure by Letters Patent—

1. The circular saw or cutter E, perforated with holes k, and arranged, in connection with the spring-bar O, bar Q, and discharging-bar R, to operate in the manner substantially as and for the purpose set forth.

2. The bow U, connected with the discharging-bar R, and arranged to operate in connection therewith, substantially in the manner as and for the purpose set forth.

3. The reel M, in combination with the circular saw or cutter E, arranged to operate substantially as and for the purpose specified.

4. The combination of the saw or cutter E, reel M, spring-bar O, bar Q, discharging-bar R, and bow U, all arranged to operate in the manner substantially as and for the purpose set forth.

JOHN D. HAMPSHIRE.

Witnesses:
SAMUEL H. HOFFACKER,
JOSEPH BALLINGER.